(12) United States Patent
Fukui et al.

(10) Patent No.: US 8,729,185 B2
(45) Date of Patent: May 20, 2014

(54) METHOD FOR PRODUCING 2-CYANOETHYL GROUP-CONTAINING ORGANIC COMPOUND

(75) Inventors: Ikuo Fukui, Joetsu (JP); Kazuhisa Hayakawa, Joetsu (JP); Soji Tanioka, Tokyo (JP); Masahiro Ohgata, Osaka (JP); Masaaki Kajitani, Osaka (JP)

(73) Assignees: Shin-Etsu Chemical Co., Ltd. (JP); Matsugaki Chemical Industries Co., Ltd. (JP)

( * ) Notice: Subject to any disclaimer, the term of this patent is extended or adjusted under 35 U.S.C. 154(b) by 0 days.

(21) Appl. No.: 13/430,822

(22) Filed: Mar. 27, 2012

(65) Prior Publication Data

US 2012/0259067 A1 Oct. 11, 2012

(30) Foreign Application Priority Data

Apr. 5, 2011 (JP) .................. 2011-084068

(51) Int. Cl.
- *C08B 11/155* (2006.01)
- *C08B 37/00* (2006.01)
- *C08B 37/18* (2006.01)

(52) U.S. Cl.
USPC ............................ 525/59; 536/43; 536/55.3

(58) Field of Classification Search
USPC ..................... 525/59; 536/43, 55.3
See application file for complete search history.

(56) References Cited

U.S. PATENT DOCUMENTS

| | | | |
|---|---|---|---|
| 2,332,049 A * | 10/1943 | Bock et al. | 536/43 |
| 4,322,524 A * | 3/1982 | Onda et al. | 536/55 |
| 5,869,732 A | 2/1999 | Nishikawa et al. | |
| 2006/0008700 A1 | 1/2006 | Yong et al. | |
| 2007/0054184 A1 | 3/2007 | Yong et al. | |
| 2008/0292968 A1 | 11/2008 | Lee et al. | |
| 2010/0316903 A1 | 12/2010 | Kim et al. | |
| 2011/0064988 A1 | 3/2011 | Yu | |
| 2012/0258348 A1 | 10/2012 | Hayakawa et al. | |
| 2012/0258349 A1 | 10/2012 | Hayakawa et al. | |
| 2012/0259067 A1 | 10/2012 | Fukui et al. | |

FOREIGN PATENT DOCUMENTS

| | | | |
|---|---|---|---|
| JP | 59226001 A | | 12/1984 |
| JP | 4357695 A | | 12/1992 |
| JP | 5178903 A | | 7/1993 |
| JP | 2010-15917 A | | 1/2010 |
| JP | 2010-50076 A | | 3/2010 |
| KR | 20110129203 A | | 12/2011 |
| WO | WO 2006/004366 A1 | | 1/2006 |
| WO | WO 2009/066916 A2 | | 5/2006 |
| WO | WO 2006/068428 A1 | | 6/2006 |
| WO | WO 2007/066967 A1 | | 6/2007 |
| WO | WO 2008/097013 A1 | | 8/2008 |
| WO | WO 2008/108583 A1 | | 9/2008 |
| WO | WO 2009/014388 A2 | | 1/2009 |
| WO | WO 2009/069928 A2 | | 6/2009 |
| WO | WO 2009/110726 A2 | | 9/2009 |

OTHER PUBLICATIONS

Li et al, Journal of Applied Polymer Science, 1999, 73, 2771-77.*
Tsutsumi et al. "High ionic conductive behavior of cyanoethylated polyvinylalcohol- and polyacrylonitrile-based electrolytes", *Solid State Ionics* 177:2683-2686 (2006).
Supplementary European Search Report corresponding to European Application No. 12162579.2 dated May 29, 2012.
Li et al. "Synthesis and Hydrolysis of β-Cyanoethyl Ether of Poly-(vinyl alcohol)", *Journal of Applied Polymer Sciences* 73:2771-2777 (1999).
European Search Report corresponding to European Application No. 12162573.5 dated Jun. 14, 2012.
European Search Report corresponding to European Application No. 12162563.6 dated Jun. 12, 2012.
Extended European Search Report corresponding to European Application No. 12162588,3 dated Jul. 26, 2012.

* cited by examiner

*Primary Examiner* — Ganapathy Krishnan
(74) *Attorney, Agent, or Firm* — Myers Bigel Sibley & Sajovec, P.A.

(57) ABSTRACT

Provided is a method for producing a 2-cyanoethyl group-containing organic compound having a high ratio of replacement by cyanoethyl groups and a high dielectric constant. More specifically, provided is a method for producing a 2-cyanoethyl group-containing organic compound comprising a step of reacting acrylonitrile with a hydroxyl group-containing organic compound in the presence of a quaternary ammonium salt as a catalyst through a Michael addition.

3 Claims, No Drawings

METHOD FOR PRODUCING 2-CYANOETHYL GROUP-CONTAINING ORGANIC COMPOUND

RELATED APPLICATION

This application claims priority from Japanese Patent Application No. 2011-084068, filed Apr. 5, 2011, the disclosure of which is incorporated by reference herein in its entirety.

BACKGROUND OF THE INVENTION

The present invention relates to a method for producing a 2-cyanoethyl group-containing organic compound through a Michael addition reaction between acrylonitrile and a hydroxyl group-containing organic compound, wherein the presence of the specified catalyst results in a 2-cyanoethyl group-containing organic compound having a high ratio of replacement by cyanoethyl groups and a high dielectric constant.

A 2-cyanoethyl group-containing organic compound possesses a highly polar 2-cyanoethyl group so that it forms a large dipole moment to exhibit a high dielectric constant when placed in an electric field. Accordingly, it is used in various fields where a high dielectric material is required, such as an organic dispersion type EL (electroluminescence) device and a heat-resistant separator for a film capacitor or a battery.

The 2-cyanoethyl group-containing organic compound can be produced, for example, through a Michael addition reaction between acrylonitrile and a hydroxyl group-containing organic compound.

To produce the 2-cyanoethyl group-containing organic compound through a Michael addition reaction between acrylonitrile and a hydroxyl group-containing organic compound, some methods have been proposed in JP 56-018601A, JP 59-226001A, JP 04-357695A and JP 05-178903A).

SUMMARY OF THE INVENTION

In each of these methods, a basic substance such as caustic soda is used as a catalyst. The catalyst has a function of increasing the nucleophilicity of the hydroxyl group of the hydroxyl group-containing organic compound, thereby improving the Michael addition reactivity with acrylonitrile. However, such a method in which the basic substance is used as the catalyst has a problem that the ratio of replacement by cyanoethyl groups does not increase very much so that a desired high dielectricity is not obtained. Accordingly, there is a demand for the method for producing the 2-cyanoethyl group-containing organic compound having the high ratio of replacement by cyanoethyl groups.

The invention has been completed under the above-described circumstance. The object of the invention is to provide the method for producing the 2-cyanoethyl group-containing organic compound having a high ratio of replacement by cyanoethyl groups and a high dielectric constant.

The present inventors have found that, as a result of many studies in order to solve the above-described problems, the 2-cyanoethyl group-containing organic compound having a high ratio of replacement by cyanoethyl groups and a high dielectric constant can be produced by using a quaternary ammonium salt as a catalyst in a method for producing a 2-cyanoethyl group-containing organic compound through a Michael addition reaction between acrylonitrile and a hydroxyl group-containing organic compound, and have accomplished the present invention.

According to the present invention, provided is a method for producing a 2-cyanoethyl group-containing organic compound, comprising a step of reacting acrylonitrile with a hydroxyl group-containing organic compound in the presence of a quaternary ammonium salt as a catalyst through a Michael addition.

According to the present invention, the 2-cyanoethyl group-containing organic compound having a high ratio of replacement by cyanoethyl groups and a high dielectric constant can be produced, and the performance of applied products comprising this compound can be improved.

DETAILED DESCRIPTION OF THE PREFERRED EMBODIMENTS

The present invention now will be described more fully hereinafter in which embodiments of the invention are provided with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. Unless otherwise defined, all technical and scientific terms used herein have the same meaning as commonly understood by one of ordinary skill in the art to which this invention belongs. All references cited are incorporated herein by reference in their entirety.

The 2-cyanoethyl group-containing organic compound can be produced using a hydroxyl group-containing organic compound and acrylonitrile as starting materials through a Michael addition as shown below.

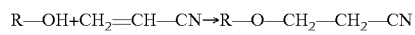

$$R\text{—}OH + CH_2\text{=}CH\text{—}CN \rightarrow R\text{—}O\text{—}CH_2\text{—}CH_2\text{—}CN$$

wherein R—OH represents a hydroxyl group-containing organic compound and R—O—$CH_2$—$CH_2$—CN represents a 2-cyanoethyl group-containing organic compound.

The ratio of the number of moles of the hydroxyl groups replaced by cyanoethyl groups to the number of moles of the hydroxyl groups in the hydroxyl group-containing organic compound which is a starting material is called the ratio (%) of replacement by cyanoethyl groups.

The hydroxyl group-containing organic compound, which is represented by R—OH, includes saccharides, sugar alcohols, polysaccharides, polysaccharide derivatives and polyvinyl alcohols and any combination thereof. The saccharides include monosaccharide such as glucose, fructose and galactose, and disaccharides such as maltose, cane sugar and lactose. The sugar alcohols include sorbitol and xylitol. The polysaccharides include cellulose, starch and pullulan. The polysaccharide derivatives include alkylcelluloses such as methylcellulose and carboxymethylcellulose; hydroxyalkylcelluloses such as hydroxypropylcellulose, hydroxyethylcellulose and dihydroxypropylcellulose; hydroxyalkylalkylcelluloses such as hydroxypropylmethylcellulose and hydroxyethylmethylcellulose; dihydroxypropylpullulan.

Among these, polysaccharides, polysaccharide derivatives or polyvinyl alcohols are especially preferred in view of film formability, binderability and so on as organic dispersion type EL device applications or lithium ion secondary battery applications. This is because 2-cyanoethyl group-containing organic compounds which can be produced from such hydroxyl group-containing organic compounds are polymers so that they are superior in film formability and binderability.

Examples of the quaternary ammonium salt include those represented by the following formula (1) or (2).

  (1)

  (2)

In the above formulae, each of $R^1$ to $R^7$ may be the same or different and represents a linear or branched aliphatic hydrocarbon group of 1 to 22 carbon atoms, preferably 1 to 14 carbon atoms. Examples of such a linear aliphatic hydrocarbon group include a methyl group, an ethyl group, a propyl group, a butyl group, a pentyl group, a hexyl group, an octyl group, a nonyl group, a decyl group, a dodecyl group, a tetradecyl group, a hexadecyl group and an octadecyl group. Examples of such a branched aliphatic hydrocarbon group include an isopropyl group and 2-ethylhexyl group.

$X^-$ represents an anion group and may be any anion group which forms a quaternary ammonium salt in combination with the above-mentioned quaternary ammonium ion. Examples of $X^-$ include $F^-$, $Cl^-$, $Br^-$, $I^-$, $CH_3COO^-$, $CF_3SO_4^-$, $CF_3CF_2SO_4^-$, $SO_4^-$, $OH^-$, $CH_3SO_4^-$, $BF_4^-$, $ClO_4^-$, $PF_6^-$, $HSO_4^-$, $HF_2^-$, $ICl_4^-$ and $BH_4^-$.

Specific examples of the quaternary ammonium ion in formula (1) include trimethylethylammonium, dimethyldiethylammonium, methyltriethylammonium, tetraethylammonium, trioctylmethylammonium, tetramethylammonium, tetra-n-butylammonium, trimethyldodecylammonium, trimethyltetradecylammonium, trimethylhexyldecylammonium, trimethyloctadecylammonium, trimethyl2-ethylhexylammonium, dimethylethyldodecylammonium, dimethylethyltetradecylammonium, dimethylethylhexadecylammonium, dimethylethyloctadecylammonium, dimethylethyl2-ethylhexylammonium, methyldiethyldodecylammonium, methyldiethyltetradecylammonium, methyldiethylhexadecylammonium, methyldiethyloctadecylammonium, methyldiethyl2-ethylhexylammonium, dimethyldihexylammonium, dimethyldioctylammonium, dimethyldidecylammonium and dimethyldidodecylammonium.

Specific examples of the quaternary ammonium ion in formula (2) include benzyltrimethylammonium, benzyltriethylammonium, benzyltri-n-butylammonium, benzyltetra-n-butylammonium, benzyldimethyldecylammonium, benzyldimethyldodecylammonium, benzyldimethyltetradecylammonium, benzyldimethylhexadecylammonium and benzyldimethyl2-ethylhexylammonium.

Examples of the quaternary ammonium salt represented by formula (1) or (2) include any combinations of the above-listed quaternary ammonium ion with the above-listed anion $X^-$. According to the invention, the quaternary ammonium salt represented by formula (1) or (2) may be used singly, or two or more quaternary ammonium salts represented by formula (1) or (2) may be used in combination.

Among these quaternary ammonium salts, benzyltriethylammonium chloride, benzyltrimethylammonium chloride, benzyltrimethylammonium hydroxide, benzyltriethylammonium hydroxide, or any combination thereof is preferably employed in view of effectiveness, cost, availability and so on.

The quaternary ammonium salt is added preferably in an amount of from 0.3 to 70 parts by weight, more preferably from 0.5 to 50 parts by weight relatively to 100 parts by weight of the hydroxyl group-containing organic compound. When it is less than 0.3 parts by weight, the ratio of replacement by cyanoethyl groups is low and a desired high dielectricity may not be attained. When it is more than 70 parts by weight, the ratio of replacement by cyanoethyl groups does not increase any more and there is no merit corresponding to the economic burden.

In order to further increase the ratio of replacement by cyanoethyl groups, a basic substance may be further added as a catalyst. Examples of the basic substance include alkali metal hydroxides such as sodium hydroxide and potassium hydroxide, alkaline earth metal hydroxides such as calcium hydroxide and magnesium hydroxide, alkali metal carbonates such as sodium carbonate and potassium carbonate, alkali metal hydrogencarbonates such as sodium hydrogencarbonate and potassium hydrogencarbonate. The basic substance may be employed singly, or two or more basic substances may be employed in combination.

The basic substance is added preferably in an amount of from 0 to 70 parts by weight, more preferably from 0 to 50 parts by weight relatively to 100 parts by weight of the hydroxyl group-containing organic compound. When it is more than 70 parts by weight, the amount of residual metal impurities derived from the basic substance may become large so that the performance of final products may be deteriorated.

When the quaternary ammonium salt is used singly and when the quaternary ammonium salt and the basic substance are used together, the content of the quaternary ammonium salt in the total weight of one or more catalysts is preferably to from 0.5 to 100% by weight, more preferably from 1.0 to 100% by weight. When it is less than 0.5% by weight, the ratio of replacement by cyanoethyl groups does not increase any more and the amount of residual metal salt impurities derived from the basic substance may become large so that the performance of final products may be deteriorated.

A method for producing a 2-cyanoethyl group-containing organic compound includes, for example, a method comprising the steps of dissolving a hydroxyl group-containing organic compound in water, then adding a quaternary ammonium salt and an optional basic substance as one or more catalysts, subsequently adding acrylonitrile, and carrying out a reaction at 0 to 60° C. for 2 to 12 hours. It is also possible to dissolve one or more catalysts in water beforehand, dissolve the hydroxyl group-containing organic compound therein, then add acrylonitrile, and carry out a reaction. Although acrylonitrile can function also as a solvent, a diluent solvent such as isopropyl alcohol, methyl ethyl ketone, acetone or the other solvent which does not react with acrylonitrile can be optionally added.

The amount of acrylonitrile to be added varies depending on the ratio of replacement by cyanoethyl groups of the 2-cyanoethyl group-containing organic compound as a reaction product. It may be preferably from 1 to 10 moles, more preferably from 2 to 7 moles per mole of hydroxyl groups of the hydroxyl group-containing organic compound. When it is less than 1 mole, the ratio of replacement by cyanoethyl groups may not increase so that a desired high dielectricity may not be attained. When it is more than 10 moles, the ratio of replacement by cyanoethyl groups does not increase any more so that there is no merit corresponding to the economic burden. When acrylonitrile functions also as a solvent, the amount of acrylonitrile to be added is preferably 3 moles or more, more preferably 6 moles or more per mole of hydroxyl groups of the hydroxyl group-containing organic compound. When the amount is less than 3 moles, the viscosity of a reaction liquid becomes high so that it may be difficult to stir the reaction liquid sufficiently. The ratio of replacement by cyanoethyl groups of the 2-cyanoethyl group-containing organic compound can be obtained from a nitrogen content determined by the Kjeldahl method.

After the reaction is over, an organic layer is collected and water is added thereto, thereby allowing a crude product to precipitate. The crude product can be purified by washing with a large amount of water. Alternatively, the crude product may be purified by re-dissolution in a solvent such as acetone and methyl ethyl ketone, followed by re-precipitation. Dehydration and/or drying after the purification eventually affords a 2-cyanoethyl group-containing organic compound.

The produced 2-cyanoethyl group-containing organic compound has a high ratio of replacement by cyanoethyl groups, a high dielectric constant and less metal salt impurities. In the organic dispersion type EL devices of light emitting elements used as liquid crystal displays of portable terminal equipment or backlights of road signs and advertisement, the luminance becomes higher as the dielectric constant of the binder becomes higher, and the life of the EL device increases as the content of metal salt impurities decreases. Accordingly, use of the 2-cyanoethyl group-containing organic compound produced by the method of the invention can increase the luminance and the life of the organic dispersion type EL device, and improve the quality of applied products. It is well-known that a substance having a high dielectric constant is superior in ion conductivity. Since a material with high ion conductivity is useful for improvement in lithium-ion battery performance such as loading characteristics, it is expected to be used in the field of this application. For example, a heat-resistant separator to be used for a lithium-ion battery has an improved heat resistance owing to the presence of a heat-resistant porous layer on one or both sides of a separator substrate such as a polyolefin film, wherein the heat-resistant porous layer is formed by binding inorganic particles such as alumina with a binder. If the 2-cyanoethyl group-containing organic compound which is superior in ion conductivity, is used as a binder in the heat-resistant porous layer of the separator, a lithium ion battery comprising the heat-resistant separator comprising the heat-resistant porous layer excels in loading characteristics. Moreover, the 2-cyanoethyl group-containing organic compound can afford a lithium ion battery having good cycling characteristics because of lower content of metal salt impurities as described above.

Hereafter, specific embodiments of the present invention will be described in detail by way of examples. However, it should not be construed that the present invention is limited to those examples.

EXAMPLES

Example 1

One part by weight of pullulan was dissolved in 4.55 parts by weight of water in a reaction flask equipped with a stirrer, then 0.75 parts by weight of an aqueous 40% by weight benzyltrimethylammonium hydroxide solution containing 0.3 parts by weight of benzyltrimethylammonium hydroxide was added thereto, and further 5 parts by weight of acrylonitrile and 4 parts by weight of acetone were added thereto, and the resulting mixture was reacted at 25° C. for 8 hours.

Subsequently, an aqueous 20% by weight acetic acid solution containing acetic acid in the same equivalent amount as that of the benzyltrimethylammonium hydroxide was added thereto. The reaction liquid became two phases of an aqueous phase and an organic phase. The organic phase was collected and poured into water under stirring to allow crude 2-cyanoethylpullulan to precipitate.

The crude 2-cyanoethylpullulan was washed with water repeatedly and subjected to re-dissolution in acetone and then re-precipitation in water, followed by dehydration and drying under reduced pressure, to obtain purified 2-cyanoethylpullulan.

Example 2

2-Cyanoethylpolyvinyl alcohol was obtained in the same manner as in Example 1 except that 1 part by weight of polyvinyl alcohol (PVA) was dissolved in 7.55 parts by weight of water in the reaction flask equipped with a stirrer, then 0.75 parts by weight of an aqueous 40% by weight benzyltrimethylammonium hydroxide solution containing 0.3 parts by weight of benzyltrimethylammonium hydroxide was added thereto, and further 6.5 parts by weight of acrylonitrile and 4.5 parts by weight of acetone were added thereto, and the resulting mixture was reacted at 32° C. for 6 hours.

Example 3

2-Cyanoethylpullulan was obtained in the same manner as in Example 1 except that 1 part by weight of pullulan was dissolve din 4.85 parts by weight of water in the reaction flask equipped with a stirrer, and then 0.25 parts by weight of an aqueous 40% by weight benzyltrimethylammonium hydroxide solution containing 0.1 parts by weight of benzyltrimethylammonium hydroxide was added thereto.

Example 4

2-Cyanoethylpullulan was obtained in the same manner as in Example 1 except that the amount of acrylonitrile was changed to 2 parts by weight and the reaction temperature and time were changed to 15° C. for 20 hours.

Example 5

One part by weight of hydroxyethylcellulose (HEC) having a substituted molar number of 1.5 was dissolved in 8 parts by weight of water in a reaction flask equipped with a stirrer, then 0.75 parts by weight of an aqueous 40% by weight benzyltrimethylammonium hydroxide solution was added thereto, and further 4.0 parts by weight of acrylonitrile and 4.5 parts by weight of acetone were added thereto, and the resulting mixture was reacted at 32° C. for 6 hours. The reaction liquid became two phases of an aqueous phase and an organic phase. The organic phase was collected and poured into water under stirring, allowing crude 2-cyanoethylhydroxyethylcellulose to precipitate. The crude 2-cyanoethylhydroxyethylcellulose was washed with water repeatedly and subjected to re-dissolution in acetone and then re-precipitation in water, followed by dehydration and drying under reduced pressure, to obtain purified cyanoethylhydroxypropylcellulose.

Example 6

One part by weight of polyvinyl alcohol (PVA) was dissolved in 7.3 parts by weight of water in a reaction flask equipped with a stirrer, then 0.2 parts by weight of benzyltriethylammonium chloride and 0.7 parts by weight of an aqueous 10% by weight caustic soda solution containing 0.07 parts by weight of caustic soda were added thereto, and further 6.5 parts by weight of acrylonitrile and 4.5 parts by weight of acetone were added thereto, and the resulting mixture was reacted at 32° C. for 6 hours.

Subsequently, an aqueous 20% by weight acetic acid solution containing acetic acid in the same equivalent amount as that of the caustic soda was added thereto. Thereafter 2-cyanoethylpolyvinyl alcohol was obtained in the same manner as in Example 1.

Example 7

One part by weight of polyvinyl alcohol was then dissolved in 4.4 parts by weight of water in a reaction flask equipped with a stirrer, then 0.0125 parts by weight of benzyltriethylammonium chloride and an aqueous 10% by weight caustic soda solution containing 0.4 parts by weight of caustic soda were added thereto, and further 6.5 parts by weight of acrylonitrile and 4.5 parts by weight of acetone were added thereto, and the resulting mixture was reacted at 32° C. for 6 hours. Thereafter 2-cyanoethylpolyvinyl alcohol was obtained in the same manner as in Example 6.

Comparative Example 1

One part by weight of pullulan was dissolved in 2.3 parts by weight of water in a reaction flask equipped with a stirrer, then 5.5 parts by weight of an aqueous 10% by weight caustic soda solution containing 0.55 parts by weight of caustic soda was added thereto, and further 5 parts by weight of acrylonitrile and 4 parts by weight of acetone were added thereto, and the resulting mixture was reacted at 25° C. for 8 hours.

Subsequently, an aqueous 20% by weight acetic acid solution containing acetic acid in the same equivalent amount as that of the caustic soda was added thereto. Thereafter 2-cyanoethylpullulan was obtained in the same manner as in Example 1.

Comparative Example 2

One part by weight of polyvinyl alcohol was dissolved in 4.4 parts by weight of water in a reaction flask equipped with a stirrer, then 5.5 parts by weight of an aqueous 10% by weight caustic soda solution containing 0.55 parts by weight of caustic soda was added thereto, and further 6.5 parts by weight of acrylonitrile and 4.5 parts by weight of acetone were added thereto, and the resulting mixture was reacted at 32° C. for 6 hours. Thereafter 2-cyanoethylpolyvinyl alcohol was obtained by in the same manner as in Example 6.

With respect to 2-cyanoethylpullulan, the 2-cyanoethylpolyvinyl alcohols and the 2-cyanoethylhydroxyethylcellulose obtained in the Examples and the Comparative Examples (hereinafter, each of these compounds may be referred to as a "sample"), nitrogen content was determined by the Kjeldahl method and a ratio of replacement by cyanoethyl groups was calculated based on the nitrogen content.

The nitrogen content, a dielectric constant and ash content of an obtained sample were measured by the following methods. The ash content is an index of the amount of metal salt impurities contained in the sample. The results are shown in Table 1.

<Measurement of Nitrogen Content>

A sample weighed precisely in a Kjeldahl flask was subjected to addition of sulfuric acid, further addition of potassium sulfate for increasing the boiling point of a liquid and copper sulfate as a catalyst for promoting decomposition, and then stirred well. The flask was heated until the solution became boiled, so that a reaction progressed. When the solution became transparent, heating was stopped and the solution was left to stand until it was cooled down to room temperature. The solution was subjected to additions of sodium hydroxide and water to make the solution alkaline, and distilled. The distillate was led into an aqueous hydrochloric acid solution having a known concentration, so that ammonia contained in the distillate was absorbed. The aqueous solution was titrated after an addition of a pH indicator. Then the amount of nitrogen contained in the sample was calculated.

<Measurement of Ash Content>

The ash content as an index of the amount of residual metal salt impurities was measured by the following method.

Five parts by weight of sample weighed precisely in a porcelain crucible was heated on a hot plate to carbonize. After cooled, the sample was subjected to an addition of 1 part by volume of concentrated sulfuric acid and heated until no more white smoke of the sulfuric acid came out.

Subsequently, the sample was heated in an electric furnace of 450 to 550° C. until it reached a constant weight, and then left to stand for cooling. The residual weight was measured. The ash content (% by weight) was calculated from the following equation.

Ash content (sulfate salt, %)={residual weight (g)/ sample (g)}×100

<Measurement of Dielectric Constant>

A sample was dissolved in a mixed solvent having a weight ratio of acetone to dimethylformamide of 9:1, cast on an aluminum foil, and then dried at 120° C. for 4 hours, to prepare a film having a thickness of about 40 μm.

Subsequently, a dielectric constant was determined by applying aluminum vapor deposition to a surface of the film and then measuring an electrostatic capacitance by an LCR meter under conditions of 1 V, 1 kHz, 20° C. and alternate current.

TABLE 1

| | | | | | | | | | measurements of | | |
| | (1) | (2) | (3) | (4) | (5) (%) | (6) (%) | (7) (%) | reaction temperature (° C.) | reaction time (hours) | ratio of replacement by cyanoethyl groups (%) | dielectric constant | ash content (%) |
| --- | --- | --- | --- | --- | --- | --- | --- | --- | --- | --- | --- | --- |
| Example 1 | pullulan | BTMAH[1] | — | 5.10 | 30 | 0 | 100 | 25 | 8 | 94.7 | 18.8 | 0.01 |
| Example 2 | PVA | BTMAH[1] | — | 5.40 | 30 | 0 | 100 | 32 | 6 | 92.3 | 18.1 | 0.01 |
| Example 3 | pullulan | BTMAH[1] | — | 5.10 | 12 | 0 | 100 | 25 | 8 | 89.5 | 17.7 | 0.01 |
| Example 4 | pullulan | BTMAH[1] | — | 2.04 | 30 | 0 | 100 | 15 | 20 | 88.8 | 17.7 | 0.01 |
| Example 5 | HEC | BTMAH[1] | — | 5.70 | 30 | 0 | 100 | 32 | 6 | 91.5 | 17.8 | 0.01 |
| Example 6 | PVA | BTEA[2] | NaOH | 5.40 | 20 | 7 | 74.1 | 32 | 6 | 90.5 | 17.9 | 0.03 |
| Example 7 | PVA | BTEA[2] | NaOH | 5.40 | 1.25 | 40 | 3.0 | 32 | 6 | 91.5 | 18.1 | 0.06 |
| Comp. Ex. 1 | pullulan | — | NaOH | 5.10 | 0 | 55 | 0 | 25 | 8 | 72.3 | 16.7 | 0.12 |

TABLE 1-continued

| | (1) | (2) | (3) | (4) | (5) (%) | (6) (%) | (7) (%) | reaction temperature (° C.) | reaction time (hours) | ratio of replacement by cyanoethyl groups (%) | dielectric constant | ash content (%) |
|---|---|---|---|---|---|---|---|---|---|---|---|---|
| Comp. Ex. 2 | PVA | — | NaOH | 5.40 | 0 | 55 | 0 | 32 | 6 | 73.8 | 16.1 | 0.11 |

(1) hydroxy group-containg organic compound
(2) quarternary ammonium salt
(3) basic substance
(4) number of moles of acrylonitrile per mole hydroxy group of hydroxy group-containing organic compound
(5) {(quarternary ammonium salt weight)/(hydroxy group-containing organic compound weight)} × 100
(6) {(basic substance weight)/(hydroxy group-containing organic compound weight)} × 100
(7) (quarternary ammonium salt weight/total catalyst weight) × 100
[1]) BTMAH is an abreviationof benzyltrimethylammonium hydroxide.
[2]) BTEA is an abreviationof benzyltriethylammonium chloride.

It is evident in Examples 1 to 5, in which a quaternary ammonium salt was used as a catalyst, and in Examples 6 and 7, in which a quaternary ammonium salt and a basic substance were used together, that the ratio of replacement by cyanoethyl groups became high and the dielectric constant increased in comparison with Comparative Examples. The ash content, which is an index of the amount of residual metal salt impurities, was low in Examples 1 to 7 because no basic substance was used or the used amount of basic substance was small.

On the other hand, in Comparative Examples 1 and 2, in which only a basic substance was used as a catalyst, the ratio of replacement by cyanoethyl groups was lower than those of the Examples and the dielectric constant was also lower. In addition, since the used amount of a basic substance was large, the ash content was also large.

The results of evaluation as an organic dispersion type EL device and as a lithium ion secondary battery in accordance with the methods below are shown in Table 2.

<Evaluation as Organic Dispersion Type EL Device>

One part by weight of a sample was subjected to an addition of 2 parts by weight of N,N'-dimethylformamide, and stirred to be dissolved therein at room temperature. The resulting sample solution was subjected to an addition of 3.2 parts by weight of electroluminescent zinc sulfide phosphor for EL having an average particle diameter of 28 μm (Type 723L produced by U.S. SYLVANIA, ZnS:Cu), and kneaded to produce a phosphor paste for a light-emitting layer. On the other hand, 3 parts by weight of the above sample solution was subjected to an addition of 4.6 parts by weight of barium titanate (BT-100P produced by Fuji Titanium Industry Co., Ltd.) having an average particle diameter of 1.5 μm and kneaded to produce a paste for an insulative reflective layer.

Next, the paste for an insulative reflective layer was printed on a 80-μm thick aluminum sheet substrate by a screen-printing method and dried to form an insulative reflective layer. Then the phosphor paste was printed on the insulative reflective layer similarly by a screen-printing method and dried to form a light-emitting layer. After dried, the insulative reflective layer had a thickness of about 24 μm and the light-emitting layer had a thickness of about 65 μm thick.

Subsequently, a silver paste was printed on a conductive surface of a transparent conductive film (ELECRYSTA 300C produced by Nitto Denko Corporation) and dried to form a feeder line, and connected to a lead electrode made of phosphor bronze. Then the feeder line-printed surface of the transparent conductive film was attached to the light-emitting layer for lamination and bonded by thermal compression (140° C., 5 kg/cm²). After a lead electrode was attached to the aluminum sheet substrate as a back electrode, the entirety of an integrated layered element was sealed with a moisture-proof sheet (EL sealer No. 4810N produced by Nitto Denko Corporation) made of polychlorotrifluoroethylene by thermal compression (120° C., 5 kg/cm²), to produce an organic dispersion type EL device. The initial luminance when a voltage of 1 kHz, 100 V was applied to these elements, and the half-life when those elements were left to stand at a temperature of 50° C. in an atmosphere having a humidity of 90%, were measured. The half-life was the time required for the luminance to become a half of the initial luminance.

<Evaluation as Lithium Ion Secondary Battery>
<Production of Separator>

The 10 parts by weight of sample was dissolved in 190 parts by weight of methyl ethyl ketone, subjected to an addition of 40 parts of $Al_2O_3$ (alumina), and mixed with a ball mill to produce a slurry. The slurry was applied to a porous polyethylene film having a thickness of 16 μm and a porosity of 40% by using a dip coating method and then dried to produce a heat-resistant separator.

<Production of Positive Electrode>

The 85 parts by weight of $LiCoO_2$ as a positive electrode active material, 10 parts by weight of acetylene black as a conductive additive, and 5 parts by weight of PVDF as a binder were uniformly mixed in N-methyl-2-pyrrolidone (NMP) as a solvent to produce a positive electrode mix-containing paste. The positive electrode mix-containing paste was applied to both sides of a 15-μm thick current collector made of aluminum foil, dried and subjected to calendaring to produce a positive electrode having an overall thickness of 150 μm. Further, a tab was welded to an exposed portion of the aluminum foil of the positive electrode to form a lead portion.

<Production of Negative Electrode>

The 95 parts by weight of graphite as a negative electrode active material, and 5 parts by weight of PVDF as a binder were uniformly mixed in NMP as a solvent to produce a negative electrode mix-containing paste. The negative electrode mix-containing paste was applied to both sides of a 10-μm thick current collector made of copper foil, dried and subjected to calendaring to produce a negative electrode having an overall thickness of 142 μm. Further, a tab was welded to an exposed portion of the copper foil of the negative electrode to form a lead portion.

<Production of Battery>

The positive electrode and the negative electrode prepared by the above methods were spirally wound with the below-described separator interposed therebetween to form a rolled electrode body. The rolled electrode body was pressed flat, and put into an exterior aluminum can. The $LiPF_6$ was dissolved in a mixed solvent having a volume ratio of ethylene carbonate to ethylmethyl carbonate of 2:1 to form a 1 mole/L LiPF$_6$ solution, which was used as an organic electrolyte. The organic electrolyte was poured into the exterior aluminum can containing the rolled electrode body and sealed to produce a lithium ion secondary battery.

<Evaluation of Cycling Characteristics of Battery>

For each of the lithium ion secondary batteries produced, charge and discharge were repeated 100 cycles by using a charge/discharge measuring instrument (HJ-101SM6 produced by Hokuto Denko Corporation). As for the charge and discharge, the battery was charged at 1.6 mA/h to 4.2 V and the battery was discharged at 1.6 mA/h to 2.75 V.

The cycling characteristics were calculated based on the discharge capacitance at the first cycle and the discharge capacitance at the 100th cycle by the following equation.

Cycling characteristic (%)={(discharge capacitance at 100th cycle)/(discharge capacitance of 1st cycle)}×100

When the cycling characteristic was 80% or more, it was evaluated as "good" and when the cycling characteristic was less than 80%, it was evaluated as "poor".

<Evaluation of Loading Characteristics>

Each of the lithium ion secondary batteries produced was subjected to constant current-constant voltage charge, which was constant current charge at a current value of 0.2 C until the battery voltage became 4.2 V and then constant voltage charge at 4.2 V. The total time for completion of charging was 15 hours. Each battery after charged was subjected to discharge at a discharge current of 0.2 C until the battery voltage became 3.0 V, thereby measuring a discharge capacitance (discharge capacitance at 0.2 C). Then, each battery was subjected to charge in the same manner as described above and then to discharge at a discharge current of 2 C until the cell voltage became 3.0 V, thereby measuring a discharge capacitance (discharge capacitance at 2 C). The ratio of the discharge capacitance at 2 C to the discharge capacitance at 0.2 C (i.e., loading characteristic) of each battery was examined. All of the above charge and discharge were carried out at an ambient temperature of 20° C.

TABLE 2

| | organic dispersion type EL device | | evaluation of battery | |
|---|---|---|---|---|
| | initial luminance (cd/m$^2$) | half-life (hours) | cylcle characteristics | load characteristics (%) |
| Example 1 | 130 | 2380 | good | 91 |
| Example 2 | 125 | 2300 | good | 92 |
| Example 3 | 120 | 2520 | good | 88 |
| Example 4 | 110 | 2140 | good | 89 |
| Example 5 | 115 | 2230 | good | 87 |
| Example 6 | 120 | 2080 | good | 87 |
| Example 7 | 120 | 2020 | good | 91 |
| Comp. Ex. 1 | 90 | 1450 | poor | 76 |
| Comp. Ex. 2 | 85 | 1370 | poor | 77 |

The organic dispersion type EL devices using the 2-cyanoethyl group-containing organic compounds of Examples 1 to 7 were high in initial luminance owing to high dielectric constants caused by the influence of the high ratios of replacement by cyanoethyl groups and exhibited long half-lives owing to small contents of metal salt impurities.

On the other hand, the organic dispersion type EL devices using the 2-cyanoethyl group-containing organic compounds of Comparative Examples 1 and 2 were not high in dielectric constant owing to the influence of the low ratios of replacement by cyanoethyl groups so that the initial luminance was not high. Moreover, because the contents of metal salt impurities were high owing to high ash contents, the organic dispersion type EL devices were short in half-life. As a result, the devices had short lives.

The lithium ion secondary batteries using the 2-cyanoethyl group-containing organic compounds of Examples 1 to 7 were superior in cycling characteristics owing to low contents of metal salt impurities. Moreover, they were superior also in ion conductivity owing to high dielectric constants so that they were superior also in loading characteristics.

On the other hand, the lithium ion secondary batteries using the 2-cyanoethyl group-containing organic compounds of Comparative Examples 1 and 2 were poor in cycling characteristics owing to use of the 2-cyanoethyl group-containing compounds having high ash content and also high content of metal salt impurities. Moreover, they were poor in loading characteristic because they were low in dielectric constant and poor in ion conductivity.

It is evident based on the above-described results that use of a quaternary ammonium salt as a catalyst in the production of a 2-cyanoethyl group-containing organic compound improves the luminance and the life of organic EL devices and the cycling characteristics and the loading characteristics of lithium ion secondary batteries.

According to the production method of the present invention, 2-cyanoethyl group-containing organic compounds having the high ratios of replacement by cyanoethy groups and high dielectric constants can be produced easily.

Having thus described certain embodiments of the present invention, it is to be understood that the invention defined by the appended claims is not to be limited by particular details set forth in the above description as many apparent variations thereof are possible without departing from the spirit or scope thereof as hereinafter claimed.

The invention claimed is:

1. A method for producing a 2-cyanoethyl group-containing organic compound comprising a step of reacting acrylonitrile with a hydroxyl group-containing organic compound in the presence of a quaternary ammonium salt as a catalyst through a Michael addition, wherein:

the hydroxyl group-containing organic compound is selected from the group consisting of starch, pullulan, alkylcelluloses, hydroxylalkylcelluloses, hydroxylalkylalkylcelluloses and polyvinyl alcohols;

the quaternary ammonium salt is selected from the group consisting of benzyltriethylammonium chloride, benzyltrimethylammonium chloride, benzyltrimethylammonium hydroxide, benzyltriethylammonium hydroxide and any combination thereof; and the quaternary ammonium salt is added in an amount of from 0.5 to 50 parts by weight relative to 100 parts by weight of the hydroxyl group-containing organic compound.

2. The method for producing a 2-cyanoethyl group-containing organic compound according to claim 1, further comprising a basic substance as a catalyst.

3. The method for producing a 2-cyanoethyl group-containing organic compound according to claim 2, wherein the basic substance is selected from the group consisting of alkali metal hydroxides, alkaline earth metal hydroxides, alkali metal carbonates, alkali metal hydrogencarbonates and any combination thereof.

* * * * *